(No Model.)
J. J. STENGER & H. A. ROHM.
TIRE TAPE.
No. 599,203. Patented Feb. 15, 1898.
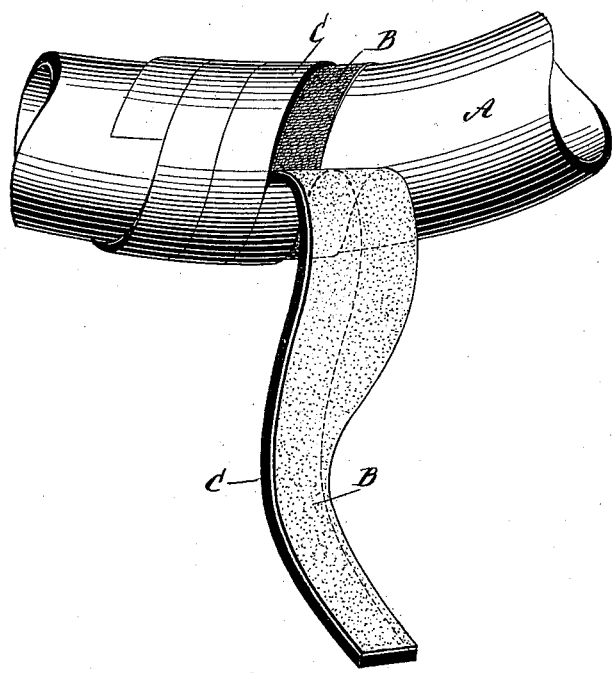
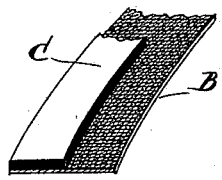

UNITED STATES PATENT OFFICE.

JULIUS J. STENGER AND HENRY A. ROHM, OF SAYVILLE, NEW YORK.

TIRE-TAPE.

SPECIFICATION forming part of Letters Patent No. 599,203, dated February 15, 1898.

Application filed November 18, 1897. Serial No. 658,941. (No specimens.)

*To all whom it may concern:*

Be it known that we, JULIUS J. STENGER and HENRY A. ROHM, of Sayville, in the county of Suffolk and State of New York, have invented a new and Improved Tire-Tape, of which the following is a full, clear, and exact description.

Our invention relates to an improvement in tire-tape, having for its object the protection of the tape so that it will not wear out by use of the wheel.

The invention consists in certain novel features of construction, which will be hereinafter described, and particularly pointed out in the appended claims.

Reference is to be had to the accompanying drawings, forming a part of this specification, in which similar characters of reference indicate corresponding parts in both views.

Figure 1 shows a section of a tire with a short piece of our tape wound thereon. Fig. 2 is a perspective view showing a short piece of the tape in its preferred form.

In using tire-tape of ordinary construction for repairing bicycle-tires we have found that a comparatively small amount of riding will wear the tape, so that it is no longer of service and must be removed and replaced by a new piece of tape. This results in considerable inconvenience, aside from the cost of the tape required.

With our invention we use a tape the body B of which resembles that of an ordinary tape—that is, consists of a narrow strip of woven material having a layer of adhesive material upon one side thereof. The outer surface of the tape is, however, supplied with a layer C of vulcanized rubber or other material which will stand the wear of contact with the road. This strip C preferably extends over only one-half of the width of the tape, as shown clearly in Fig. 2.

In using this tape it is wound about the tire A in the usual manner, forming a spiral, the portion of the tape which has the vulcanized strip C thereon being wound so as to lap over that portion which has no vulcanized strip upon it. This, as shown in Fig. 1, will result in covering that part of the tape which is not protected by the vulcanized rubber and leaving exposed only that part of the tape which is protected by the rubber. At the termination of the wrap the tape may, if desired, be trimmed of the portion thereof which is exposed and not covered by the rubber. By this means the tape is protected in such manner that it will wear an indefinite length of time. The cost will be but slightly greater than that of the ordinary tape, while the length of wear will be much increased, and there will be less inconvenience experienced in the use of the tape.

Having thus described our invention, we claim as new and desire to secure by Letters Patent—

1. A tire-tape having a coating of vulcanized rubber or similar material upon its outer surface extending over a portion only of its width, substantially as described.

2. A tire-tape having a protective coating upon its outer surface extending over a portion only of its width, substantially as described.

JULIUS J. STENGER.
HENRY A. ROHM.

Witnesses:
S. THORNHILL,
ELLSWORTH CRUM.